United States Patent [19]

Peerman

[11] 4,438,225
[45] Mar. 20, 1984

[54] POLYESTER POLYOLS FROM BISHYDROXYMETHYL TRICYCLO COMPOUNDS AND CAPROLACTONE AND POLYURETHANES BASED THEREON

[75] Inventor: Dwight Peerman, Minnetonka, Minn.

[73] Assignee: Henkel Corporation, Minneapolis, Minn.

[21] Appl. No.: 484,320

[22] Filed: Apr. 12, 1983

[51] Int. Cl.$^3$ .................. C08G 18/14; C08G 18/32; C07C 69/66
[52] U.S. Cl. .................. 521/172; 528/74; 528/905; 528/906; 528/75; 560/188
[58] Field of Search .............. 560/188; 528/74; 521/172

[56] References Cited

U.S. PATENT DOCUMENTS

| 3,524,890 | 8/1970 | Cox | 528/74 |
| 3,646,113 | 2/1972 | Rick et al. | 560/188 |
| 3,726,887 | 4/1973 | Pohl et al. | 521/172 |
| 4,178,425 | 12/1979 | Emmons et al. | 528/74 |
| 4,319,049 | 3/1982 | Rogier | 528/75 |

FOREIGN PATENT DOCUMENTS

| 934889 | 11/1955 | Fed. Rep. of Germany . |
| 1916287 | 10/1970 | Fed. Rep. of Germany . |
| 2013316 | 10/1970 | Fed. Rep. of Germany . |
| 2200022 | 7/1973 | Fed. Rep. of Germany . |
| 2307627 | 9/1974 | Fed. Rep. of Germany . |

*Primary Examiner*—H. S. Cockeram
*Attorney, Agent, or Firm*—Bacon & Thomas

[57] ABSTRACT

Polyester polyols which are the reaction products of bishydroxymethyl tricyclo-decanes/decenes and a caprolactone in various ratios are disclosed. The polyester polyols are useful in forming polyurethane elastomers, foams, coatings and adhesives.

15 Claims, No Drawings

POLYESTER POLYOLS FROM BISHYDROXYMETHYL TRICYCLO COMPOUNDS AND CAPROLACTONE AND POLYURETHANES BASED THEREON

BACKGROUND OF THE INVENTION

1. Technical Field of the Invention

The present invention is directed to polyester polyols derived from bishydroxymethyl tricyclo compounds and caprolactone and polyurethanes made therefrom.

2. Description of the Prior Art

It is known that polyurethanes can be produced by reaction of polyisocyanates and polyols. The polyols for the reaction may be prepared from many materials. For example, the work of Hostettler and Hostettler et al in U.S. Pat. No. 2,933,477 issued Apr. 19, 1960, U.S. Pat. No. 2,962,514, issued Nov. 29, 1960, and U.S. Pat. No. 2,962,455, issued Nov. 29, 1960, teaches that caprolactone may be utilized to form polyols which are then useful in the formation of other materials, such as polyurethanes. However, the Hostettler and Hostettler et al polyols are solids at room temperature and thus must be heated above their melting point in order to be capable of reacting effectively with other materials.

It is known from U.S. Pat. No. 4,319,049, issued Mar. 9, 1982, to Rogier and the references cited therein that various polycyclic compounds are useful in the resin art in the preparation of various thermoplastic and thermosetting resins.

The use of dimethylol tricyclodecane derived from dicyclopentadiene, in the manufacture of polyurethanes is discussed by Asai, *Applications of Dicyclopentadiene in the Polymer Industry*, Porima Daijesuto, Vol. 30, No. 12 (1978) pp 33–41. The geminal bis(hydroxymethyl) form of these polycyclic compounds is the subject of the aforementioned U.S. Pat. No. 4,319,049 to Rogier.

To the extent that the disclosures of each of the foregoing references are necessary to the understanding of the present invention, they are hereby incorporated by reference.

SUMMARY OF THE INVENTION

The present invention is directed to polyester polyols derived from bishydroxymethyl tricyclo compounds and caprolactone and polyurethanes derived from these polyols. The polyester polyols of the invention may be may be defined by the structural formulae:

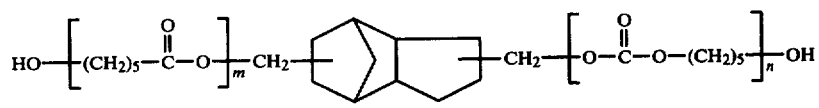

and

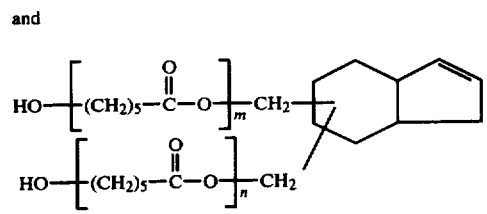

where m and n are integers ranging from 0 to 20 and may be the same or different, with the proviso that at least one of m and n is not zero. Formula I depicts the polyols derived from bishydroxymethyl tricyclodecane and caprolactone while formula II depicts the polyols derived from bishydroxymethyl tricyclodecene and caprolactone.

Polyurethanes are prepared from the polyester polyols of the invention by reacting one or more of said polyols with at least one polyisocyanate.

DETAILED DESCRIPTION OF THE PREFERRED EMBODIMENTS

The bishydroxymethyl tricyclo reactants of the invention are derived from dicyclopentadiene having the structural formula:

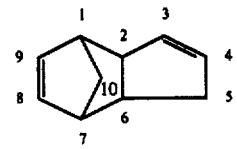

The bishydroxymethyl tricyclodecane derivative is prepared by hydrogenating the dialdehyde that has been obtained via an oxo-reaction of dicyclopentadiene as follows:

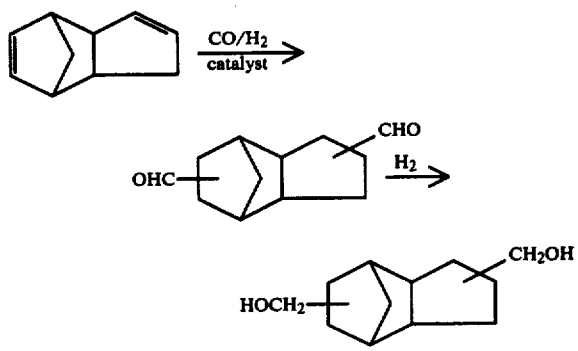

Cobalt carbonyl and rhodium oxide are typically used to catalyze the oxo-reaction. The hydroxymethyl groups are attached at the 8 or 9 and 3 or 4 positions on the ring structure corresponding to the points of unsaturation of the dicyclopentadiene starting material.

It is also possible to prepare geminal bishydroxy compounds by employing selective reaction conditions described in detail in U.S. Pat. No. 4,319,049 to Rogier. The reaction sequence to obtain the geminal bishydroxymethyl derivative proceeds as follows:

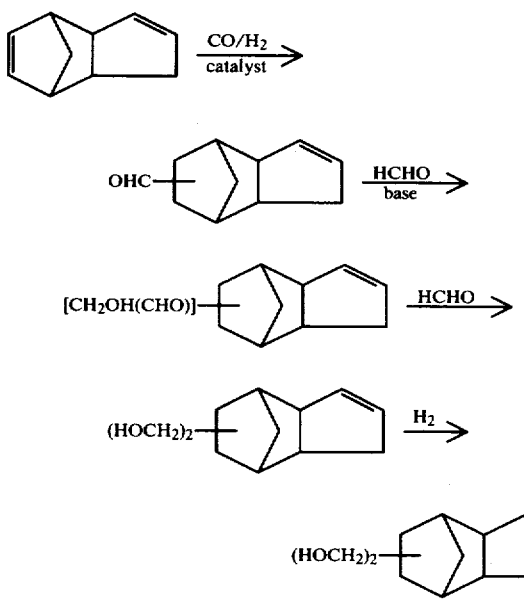

In this reaction sequence, hydroformylation is restricted to the 8 and 9 positions of the dicyclopentadiene ring, thereby producing the geminal bishydroxymethyl tricyclodecane derivatives. These compounds are identified as 8,8(9,9)-bis(hydroxymethyl)tricyclo[5,2,1,0$^{2,6}$]decane. To obtain the unsaturated bishydroxymethyl tricyclodecane derivatives, the final hydrogenation step is omitted.

In forming the polyester polyols of the present invention, both geminal and non-geminal forms of the bishydroxymethyl tricyclo compounds are acceptable reactants. Accordingly, as used hereinafter, the structural formula:

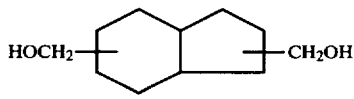

is intended to encompass both forms of bishydroxymethyl tricyclodecane, while the formula

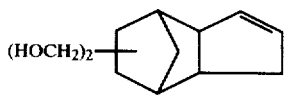

denotes the unsaturated geminal derivatives 8,8(9,9)bis(-hydroxymethyl)tricyclo[5,2,1,0$^{2,6}$]-dec-3-ene.

The caprolactone reactant which has produced successful polyester polyols of the invention is an unsubstituted epsilon caprolactone having the structural formula:

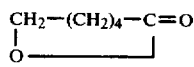

although it is possible that other caprolactones, particularly substituted epsilon caprolacetones will produce acceptable polyester polyols for the purposes of the invention. Unsubstituted epsilon-caprolactones are derived from 6-hydroxy-hexanoic acid. Substituted epsilon-caprolactones are prepared by conversion of substituted cyclohexanes obtained from substituted phenols.

The polyester polyols of the invention are prepared by the reaction of a bishydroxymethyl tricyclo compound and caprolactone in a molar ratio of from about 1:1 to 1:20. The polyols so prepared may be represented by the structural formula:

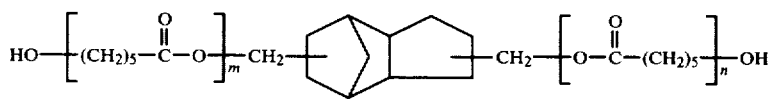

and

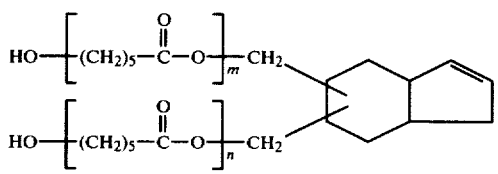

where m and n are integers ranging from 0 to 20, with at least one m and n being a non-zero integer. The reaction product will actually be a mixture of polyester polyols of these formulae with the values for m and n being statistically distributed depending upon such factors as the ratio of reactants, the reaction temperature and the relative reactivity of the hydroxyl groups on the bishydroxymethyl tricyclo reactant. In most cases, a statistically normal distribution of molecular weights will be attained, particularly when the ratio of caprolactone to hydroxyl is two or greater.

The reaction of bishydroxymethyl tricyclo compound and caprolactone is preferably conducted at elevated temperature, typically from about 115° to 130° C., and, preferably, in the presence of from about 0.01 to 0.1% by weight based upon the weight of the bishydroxymethyl tricyclo compound of a suitable catalyst such as butyltin tris(2-ethylhexoate).

A principal advantage of the polyols of the invention is that at lower molar ratios (1/8) of bishydroxymethyl tricyclo compound/caprolactone they exist as liquids of relatively low viscosity at room temperature. This characteristic permits the polyols to be transported to reactors and mixed in reactors with polyisocyanates at room temperature. Many other polyol reactants for producing polyurethanes including those derived from caprolactone and bishydroxymethyl tricyclodecane are not liquid at room temperature and so must be transported in heated lines to the reactor or dissolved in a suitable solvent. For example, a polyester polyol formed by reacting two moles of bishydroxymethyl tricyclodecane with one mole of caprolactone, in accordance with the present invenion, having an equivalent weight of 214 exhibits a viscosity of 37 poises at 23° C. In comparison, a polyester polyol formed from two moles of bishydroxymethyl tricyclodecane and one mole dimethyl terephthalate, having an equivalent weight of 273, is a solid at 23° C. and has a viscosity of 2795 poises at 70° C.

When the molar ratio of bishydroxymethyl tricyclo compound to caprolactone is increased, the resulting products are low melting solids. These solids products melt in the range of 34°–42° C. and are also easily melted and mixed with isocyanates with which they demonstrate good compatibility.

The bishydroxymethyl tricyclodecane derivative can also be alkoxylated to reduce its viscosity and the viscosity of the polyester polyol derived therefrom. This, in turn, permits the use of higher ratios of caprolactone to bishydroxymethyl tricyclodecane in forming liquid polyols in accordance with the invention. Generally, alkoxylation is accomplished using ethylene or propylene oxide in a ratio of from 1 to 10 moles alkylene oxide per hydroxyl equivalents.

In preparing polyurethanes according to the invention, the polyester polyol reactant is reacted with polyisocyanates. Suitable polyisocyanates include ethylene diisocyanate, trimethylene diisocyanate, hexamethylene diisocyanate, propylene-1, 2-diisocyanate, ethylidene diisocyanate, cyclopentylene-1, 3-diisocyante, the 1,2-, 1,3- and 1,4-cyclohexylene diisocyanates, the 1,3- and 1,4-phenylene diisocyanates, diphenylmethane diisocyanates, polymethyleneisocyanates, the 2,4- and 2,6-toluene diisocyanates, the 1,3- and 1,4-xylylene diisocyanates, bis(4-isocyanatoethyl) carbonate, 1,8-diisocyanate-p-methane, 1-methyl-2, 4-diisocyanatocyclohexane, the chlorophenylene diisocyanates, naphthalene-1,5-diisocyanate triphenylmethane-4,4', triisocyanate, isopropylbenzene-alpha-4-diisocyanate, 5,6-bicyclo[2.2.1] hept-2-ene diisocyanate, 5,6-diisocyanatobutylbicyclo[2.2.1] hept-2-ene and similar polyisocyanates.

Of particular interest in the present invention are trimethylhexamethylene diisocyanate available from VEBA, heptadecyl (C17) diisocyanate, DDI 1410 an aliphatic C-36 diisocyanate available from the Henkel Corporation of Minneapolis, Minn. (generally such diisocyanates having from 12 to 40 carbons in the aliphatic radical may be used in the present invention) and Isonate 143L diisocyanate, a modified diphenylmethane diisocyanate (MDI) available from Upjohn Corp. Further urethane components are isophorone diisocyanate available from VEBA and Desmodur N an aliphatic triisocyanate available from Mobay. Desmodur N is more particularly defined as the reaction product of 3 moles of hexamethylene diisocyanate and water having an isocyanate equivalent weight as later defined of 191. Other adducts or prepolymers of the polyisocyanate include Desmodur L and Mondur CB which are the adducts of toluene diisocyanate. The foregoing materials have an isocyanate equivalent weight of approximately 250.

The amount of the polyisocyanate utilized in forming the urethane compositions of the present invention is expressed on a percentage equivalent weight basis with respect to the hydroxyl functionality of the polyol reactant. Desirably, each hydroxy functional group on the polyol will react on a 1:1 stoichimetric basis with the isocyanate functionality of the polyisocyanate compound. It is quite feasible, however, to form the urethane linkage using from about 70% to 105%, preferably from about 85% to 100%, on a hydroxyl isocyanate equivalent basis of the polyisocyanate to form the urethane product. These equivalent weights of reactants will generate polyurethanes having an NCO index between about 95 to 140 and preferably between about 100 to 115. The determination of the amount of polyisocyanate required for a given polyol is readily made using the aforementioned hydroxyl or isocyanate equivalent weights and is well known to those of skill in the art. Mixtures of polyisocyanates and polyols may also be used in accordance with these parameters.

Crosslinked polyurethanes are obtained whenever the hydroxyl functionality of the polyol reactant is greater than 2.0. Otherwise, thermoplastic polyurethanes are obtained.

To form the urethane reaction product, the polyester polyol and the organic polyisocyanate reactants are mixed together in the proper proportions. When utilized as a coating the compounds are then quickly spread with a knife blade, brush or spray over the surface of the article to be coated. Where molded articles are desired various techniques such as casting, injection molding, reaction injection molding may be employed.

If desired, various urethane catalysts may be employed to promote the reaction. Examples of such urethane catalysts include triethylene diamine, N-ethylmorpholine, dimethyl piperazine, triethylamine, N,N,N',N'-tetramethylbutane 1,3-diamine, dibutyltin dilaurate, stannous octoate, stannous oleate, and stannous tallate, as well as other art recognized urethane catalysts. Typical levels of the urethane catalyst are from about 0.001% to about 5% by weight of the urethane components.

Trimerization catalysts such as diethylene diamine and BF$_3$ derivatives, can be included in the reaction mixture to convert the polyisocyanates to polyisocyanurates in situ and then to polyurethanes.

One or more additional polyols may be included in the reaction mixture to modify the properties of the resulting polyurethane, principally hardness and elasticity. Short chain polyols act as hard segment contributors to increase elastomer hardness while long chain polyols act as soft segment contributors to enhance the elastic properties of the elastomer. Such modifying polyols including alkyl or cycloalkyl polyols, ester linked polyols, ether linked polyols, ether and ester linked polyols and hydroxy functional acrylic copolymers.

Specific examples of the alkyl and cycloalkyl polyols include 2,5-hexanediol, 1,6-hexanediol, ethylene glycol, glycerol 1,2,6-hexanetriol, pentaerythritol, 1,4-cyclohexane diol, and 1,4-butanediol.

Examples of ester linked saturated polyols include Niax PCP0200 and PCP0240 both available from Union Carbide and having respective molecular weights of approximately 530 and 2000. Both of the foregoing compounds are diols. Niax PCP0300 also available from Union Carbide is a caprolactone-ester triol having an approximate molecular weight of 540. Niax PCP0310 also available from Union Carbide is a caprolactone ester triol having a molecular weight of approximately 900.

The ether linked saturated polyols include compounds such as diethylene glycol and triethylene glycol both available from Fisher. Other ether linked saturated polyols include Teracol 1000 and 2000, available from Dupont. Further ether linked saturated polyols useful in the present invention include the Polymeg Q0650, Q0100, and Q0200 all of which are ether diols available from Quaker having a respective molecular weight of approximately 650, 1000 and 2000. Pluracol P1010 having an approximate molecular weight of 1050 available from Wyandotte is an example of polypropylene oxide ether linked diol useful in the present invention. Similar Wyandotte products useful as saturated polyols in the present invention include Pluracol TP440 and 150 which are propylene oxide ether linked triols having respective molecular weights of approximately 425 and 1560. In similar fashion Pluracol GP3030 is another saturated polyol suitable for the present invention available from Wyandotte. The foregoing material is a glycerine polypropylene ether linked triol having an approximately molecular weight of 2900.

Additional Pluracols useful in the present invention include Plurcol PEP450 which is a pentaerythritol polypropylene oxide ether linked tetrol having a molecular weight of 405 and Pluracol 493 an ether linked tetrol having a molecular weight of approximately 3630.

In addition, polyols having hydroxyl functionalities greater than 2.0 may be included in the reaction mixture as crosslinking agents. Suitable polyols for this purpose are disclosed in U.S. Pat. No. 4,216,344, issued Aug. 15, 1980 to Rogier. Additional materials which may be used as crosslinking agents are found in the application of Rogier, Ser. No. 233,793, filed Feb. 12, 1981.

Numerous other modifying agents may be added to the polyurethanes of the invention to adapt the elastomer to particular uses. Thus, fillers such as carbon blacks, zinc oxide, titanium oxide and the like can be added. Plasticizers and dyes are other examples of suitable modifying agents.

Because many of the hydroxymethyl polyol and polyisocyanate reactants are liquid, additional heating is only required where lower viscosity for efficient mixing is desired. For convenience the reactants may be heated to the temperature of reaction typically from about 0° to about 110° C., preferably from about room temperature, i.e., 22° C. to about 85° C. The system is operated under a high vacuum to degas the reaction mixture for about fifteen minutes. The reaction mixture is then cured for a time period of from about one to twenty-four hours depending upon the curing temperature and the particular polyurethane formed. Optimum curing cycles can be readily determined without undue experimentation by those of skill in the art.

Polyurethanes of the invention may also be prepared as isocyanate terminated pre-polymers by conducting the reaction with a substantial excess of polyisocyanate and not curing the reaction mixture. The pre-polymer provides an intermediate form of the polyurethane which is more convenient to handle than the individual reactants. By mixing the pre-polymers with additional polyol and curing, the pre-polymer is converted to a polyurethane resin.

Pre-polymers are particularly useful in making microcellular foam. The pre-polymer is mixed with polyol and a blowing agent and then poured into a mold which is heated to form microcellular polyurethane foam.

EXAMPLE 1

The polyester polyols of the invention are obtained by reacting caprolactone with bishydroxymethyl tricyclodecane in the presence of heat and an appropriate catalyst. The following example will illustrate the process.

To 255.1 grams (1.3 moles) of bishydroxymethyl tricyclodecane were added 299.6 grams (2.6 moles) of E-caprolactone and the reactants heated to 100° C. with stirring. To the reactants were added 0.62 grams $BF_3$ etherate and heating at 100° C. for three hours under $N_2$ was continued. The temperature was reduced to 50° C. and maintained there without stirring for sixty-three hours. The catalyst was neutralized with an excess of anionic ion exchange resin after dissolving in methanol at 60% solids. The product, after removal of the methanol, had the following properties

| | |
|---|---|
| Brookfield Viscosity (72° F.) | = 33.2 poises |
| Color (Gardner) | = 5 |
| Hydroxyl equivalent wt. | = 195.6 |
| Acid value | = 2.5 |

EXAMPLE 2

A preferred method of preparing a polyester polyol in accordance with the invention is as follows: a reaction vessel is charged with 40 grams (0.2 moles) of bishydroxymethyl tricyclodecane and 182 grams (1.6 moles) of caprolactone. These were heated to 120° C. with stirring and then 0.03 grams of butyltin tris(2-ethylhexoate) was added as catalyst. Heating was continued for 8 hours at 120° C. The reaction was stripped of volatiles for 1 hour at 188° C. and 180 microns Hg pressure.

The resulting product had a hydroxyl equivalent weight of 560.5 and a viscosity of 20.6 poise at 25° C. After one month storage this liquid developed a few crystals which melted at 34° C.

Using the method of the above example, other molar ratios were reacted with products having properties as follows:

| Molar Ratio | OH Eq. Wt. | Melting Point, °C. |
|---|---|---|
| 1/12 | 711 | 42 |
| 1/16 | 873 | 40 |

EXAMPLE 3

Exemplary of the usage of this fluid, easily handled, polyester polyol is the reaction with diisocyanates to form useful polyurethane products. An elastomer was prepared using a modifying polyether polyol and 9,9(10,10)-bis(hydroxymethyl) octadecanol (hereinafter referred to as C-20 Triol) as a crosslinking agent.

The blend of polyols comprised 49.1 grams (0.25 equivs.) of the bis(hydroxycaproate)ester of bishydroxymethyl tricyclodecane, 46.17 grams (0.143 equivs.) of polyoxytetramethylene glycol of MW-650 (hereinafter referred to as Polymeg 650), and 10.97 grams (0.095 equivs.) of C-20 Triol. This blend was heated to 70° C.

under vacuum for 30 minutes to degas the reactants. The reactants were cooled to 30° C. and 73.76 grams (0.50 equivs.) of Isonate 143L (a modified diphenylmethane diisocyanate (MDI) containing a high percentage of MDI and a lesser amount of polycarbodiimide adducts) were added with stirring. This was degassed for four minutes during which time the temperature rose by exothermic heat of reaction from 30° C. to 70° C. The product was quickly transferred to appropriate release-treated molds and cured for twenty hours at 100° C. It was then removed from the molds and aged at 50% relative humidity and 75° F. for seven days. The resulting elastomer had the following properties

| Shore Durometer Hardness, D | =66 |
| Tensile strength at break, psi | =4335 |
| Tensile strength at yield, psi | =1500 |
| Elongation at break, % | =165 |
| Split tear strength, PI | =466 |
| Compression Set, % | =61.2 |
| Water absorption, 24 hrs, 70° C., % | =1.2 |
| Tensile strength, psi, and elongation, % after 18 hrs in steam at 125° C., (dry) | =5255/245 |

In this elastomer the bis(hydroxycaproate)ester of bishydroxylmethyl tricyclodecane is considered the hard segment contributor and the polyoxytetramethylene glycol is the soft segment contributor and are used in approximately equal quantities. The C-20 Triol is the crosslinker in this cast elastomer to lend greater heat stability to the product.

EXAMPLE 4

To determine whether the hardness of the elastomer could be varied in the normal fashion by adjusting the molecular weight of the polyoxytetramethylene glycol, another elastomer was prepared. The ratio of reactants was:

| Bishydroxymethyl caprolactone ester of bishydroxymethyl tricyclodecane | 0.022 equivs., 4.21 gms |
| Polyoxytetramethylene glycol, MW=1000 | 0.0123 equivs., 6.52 gms. |
| C-20 Triol | 0.0082 equivs., 0.94 gms |
| Isonate 143 L | 0.043 equivs., 6.33 gms |

This elastomer was produced in the same manner as that described in Example 2 and cured similarly. The hardness decreased to Shore A=74. Thus increasing the MW of the soft segment contributor effectively reduced the hardness of the elastomer

EXAMPLE 5

Polyurethanes can also be prepared in accordance with the invention from alkoxylated bishydroxymethyl tricyclodecane derivatives of caprolactone as the following example illustrates.

An ethoxylated bishydroxymethyl tricyclodecane was prepared by reacting ethylene oxide with bishydroxymethyl tricyclodecane in a ratio of ethoxy units to equivalent hydroxy of 3.5 to 1. The ethoxylated polyol was then reacted with caprolactone on a 1:1 molar basis. To 80.4 grams (0.32 equiv.) of this compound were added 58.7 grams (0.1824 equiv.) of Polymeg 650 and 14.0 grams of C-20 Triol. All polyols were mixed and degassed as in Example 1, then 91.8 grams (0.64 equiv.) of Isonate 143L were added. This mixture was heated to 60°-70° C. and degassed under vacuum. When the viscosity became obviously higher (about seven and half minutes) it was poured into molds, cured twenty hours at 100° C. and conditioned seven days at 23° C. and 50% relative humidity before testing. The resulting elastomer had the following properties:

| Shore Durometer Hardness, D | =43 |
| Tensile strength at break, psi | =1925 |
| Tensile strength at yield, psi | =160 |
| Elongation at break, % | =260 |
| Split tear strength, PI | =155 |
| Compression Set, % | =19 |
| Water absorption, 24 hrs, 70° C., % | =2.3 |
| Tensile strength, psi, and elongation, %, after 18 hrs in steam at 125° C., (dry) | =2230/400 |

EXAMPLE 6

To demonstrate that useful elastomers can be prepared from unsaturated tricyclo derivatives, the following example was performed.

To 47.31 grams (0.22 equiv.) of the bis(hydroxycaproate) ester of bis(hydroxymethyl) tricyclodecene were added 55.74 grams (0.10 equiv.) of Tercol 1000 (a polyoxytetramethylene glycol of MW=1000) and 12.00 grams (0.10 equiv.) of C-20 Triol. The three polyols were heaed to 60° C. and degassed under vacuum for 30 minutes and cooled before 64.89 grams (0.44 equiv.) of Isonate 143L were added. The exothermic heat of reaction raised the temperature in four minutes to 60° C. while vacuum degassing the reactants. The elastomer was cured twenty hours at 100° C. and conditioned seven days at 23° C. and 50% relative humidity before testing. The resulting elastomer had the following properties:

| Shore Durometer Hardness, D | =43 |
| Tensile strength at break, psi | =4754 |
| Tensile strength at yield, psi | =185 |
| Elongation at break, % | =240 |
| Split tear strength, PI | =156 |
| Compression Set, % | =23 |
| Water absorption, 24 hrs, 70° C., % | =1.4 |
| Tensile strength, psi, and elongation, %, after 18 hrs in steam at 125° C., (dry) | =3440/245 |

EXAMPLE 7

In a 500 ml round bottom flash, 89.88 g (0.28 eq.) of bishydroxymethyl tricyclodecane/caprolactone (1/4) was heated under vacuum for 1½ hours at 80° C. After cooling to 25° C., vacuum was released with nitrogen. The degassed polyol was catalyzed with 0.01 wt.% dibutyltin dilaurate. After thorough mixing, 42,37 grams (0.294 eq.) of degassed Isonate 143L was added and vacuum reapplied. After three minutes of vigorous stirring, the exotherm had built to 50° C. Then with viscosity building, vacuum was released. The contents of the flask was poured into molds (⅛"×6"×6") and placed into a press at 10,000 psi and 105° C. After gelation, the elastomer was demolded and cured for a total of 18 hours at 105° C. After storing for 1 week at 72° F. and 50% R. H. the elastomer had the following properties:

| Shore Durometer Hardness, A | =95 |
| Tensile strength at break, psi | =5540 |

-continued

| | |
|---|---|
| Elongation at break, % | =330 |
| Set after break, % | =0 |
| Split tear strength, PI | =420 |
| Compression set, % | =95 |
| Water absorption, 24 hrs, 70° C., % = | =1.4 |
| Tensile strength, % retained, after 18 hrs in H₂O at 70° C. | =68<br>=68 |

EXAMPLE 8

Using the same procedure as Example 7, 63.8 g (0.115 eq.) of bishydroxymethyl tricyclodecane/caprolactone was blended with 4.16 g (0.092 eq.) of 1,4 butanediol and 33.0 g (0.18 eq.) of a polycaprolactone triol (equivalent wt=181). After catalyzing to 0.0025 wt. % with dibutyltin dilaurate, the polyol blend was reacted with 59 g (0.42 eq.) of Isonate 143L. After 3 minutes, exotherm reached 45° C. The cured elastomer had the following properties:

| | |
|---|---|
| Shore Durometer Hardness, D | =61 |
| Tensile strength at break, psi | =4590 |
| Set after break, % | =4 |
| Elongation at break, % | =190 |
| Split tear strength, PI | =150 |
| Compression set, % | =32 |
| Water absorption, 24 hrs, 70° C., % | =1.5 |
| Tensile strength, % retained, after 18 hrs. in H₂O at 70° C. | =55 |

EXAMPLE 9

Using the same procedure as Example 7, 67.0 grams (0.12 eq.) of bishydroxymethyl tricyclodecane/caprolactone (1/12) was blended with 0.8 grams (0.24 eq.) of 1,4 butanediol. After catalyzing to 0.01 wt. % with dibutyltin dilaurate, the polyol blend was reacted with 54.3 grams (0.38 eq.) of Isonate 143L. After 1 minute, exotherm reached 40° C. The cured elastomer had the following properties:

| | |
|---|---|
| Shore Durometer Hardness, A | =90 |
| Tensile strength at break, psi | =6710 |
| Elongation at break, % | =310 |
| Set after break, % | =16 |
| Split tear strength, PI | =120 |
| Compression set, % | =63 |
| Water absorption, 24 hrs, 70° C., % | =1.3 |
| Tensile strength, % retained, after 18 hrs. in H₂O at 70° C. | =91 |

From the foregoing detailed description and Examples, it should be apparent that the invention encompasses a wide range of compounds. It should also be apparent that while the invention has been described in terms of various preferred embodiments, and exemplified with respect thereto, those of skill in the art will readily appreciate that various modifications, changes, omissions, and substitutions may be made without departing from the spirit of the invention. It is therefore intended that the present invention be limited solely by the scope of the following claims.

I claim:

1. Polyester polyols formed by the reaction of a bishydroxymethyl tricyclo compound of the formulae:

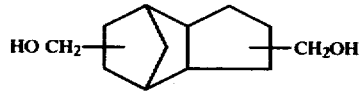

and

and alkoxylated derivatives thereof with a caprolactone in a molar ratio of bishydroxymethyl tricyclo compound to caprolactone between about 1:1 and 1:20.

2. The polyols of claim 1, wherein said caprolactone is an epsilon-caprolactone.

3. The polyols of claim 1, wherein the molar ratio of bishydroxymethyl tricyclo compound to caprolactone is from about 1:1 to 1:8.

4. The polyols of claim 1, wherein said bishydroxymethyl tricyclo compound is selected from the group consisting of 3(4),8(9)-bishydroxymethyl tricyclo[5,2,1 0$^{2,6}$]decane, 8,8(9,9-bishydroxymethyl tricyclo[5,2 1,0$^{2,6}$]decane, 8,8(9,9)-bishydroxymethyl tricyclo[5,2 1 0$^{2,6}$]dec-3-ene, and mixtures thereof.

5. The bis(hydroxycaproate)ester of bishydroxymethyl tricyclodecane having the formula:

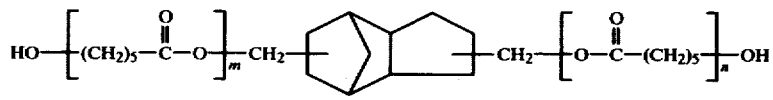

where m and n are integers ranging from 0 to 20, with the proviso that m and n are not both zero.

6. The compounds of claim 5, wherein one of m and n is zero and the other is 1.

7. Urethane linked reaction products derived from at least one polyester polyol of claim 1 and at least one polyisocyanate.

8. The reaction products of claim 7, said urethane linked reaction products having an NCO index between about 70 and 110.

9. The reaction products of claim 7, wherein said urethane linked reaction products are derived from said at least one polyester polyol, said polyisocyanate and at least one modifying polyol.

10. The reaction products of claim 9, wherein said modifying polyol is selected from the group consisting of alkyl and cycloalkyl polyols, ester linked polyols, ether linked polyols, ether and ester linked polyols and hydroxy functional acrylic copolymers.

11. The reaction products of claim 7, wherein said at least one polyisocyanate is selected from the group consisting of toluene diisocyanate, xylene diisocyanate, isophorone diisocyanate, hexamethylene diisocyanate, the triisoxyanate adduct of hexamethylene diisocyanate and water, trimethyl hexamethylene diisocyanate, diphenylmethane diisocyanate, aliphatic diisocyanates having 12 to 40 carbon atoms in the aliphatic moiety and mixtures thereof.

12. An elastomer formed from a urethane linked reaction product of claim 7.

13. A microcellular foam formed from a urethane linked reaction product of claim 7.

14. A protective coating formed from a urethane linked reaction product of claim 7.

15. An adhesive formed from the urethane linked reaction product of claim 7.

* * * * *